April 17, 1962     E. N. HENRY ETAL     3,030,596

INSULATED ELECTRICAL APPARATUS

Filed Oct. 30, 1958     2 Sheets-Sheet 1

WITNESSES
John E. Healy, Jr.
Clement L. McHale

INVENTORS
Edward N. Henry &
Carl Piaia, Jr
BY
F. E. Browder
ATTORNEY

April 17, 1962 E. N. HENRY ETAL 3,030,596
INSULATED ELECTRICAL APPARATUS
Filed Oct. 30, 1958 2 Sheets-Sheet 2
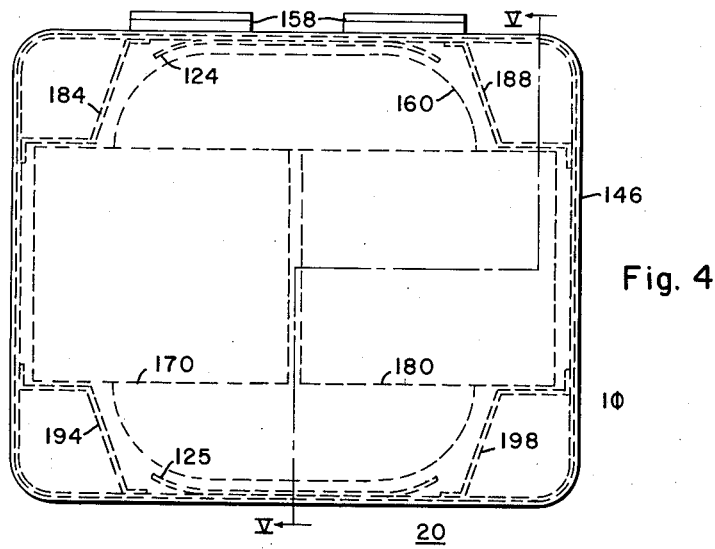
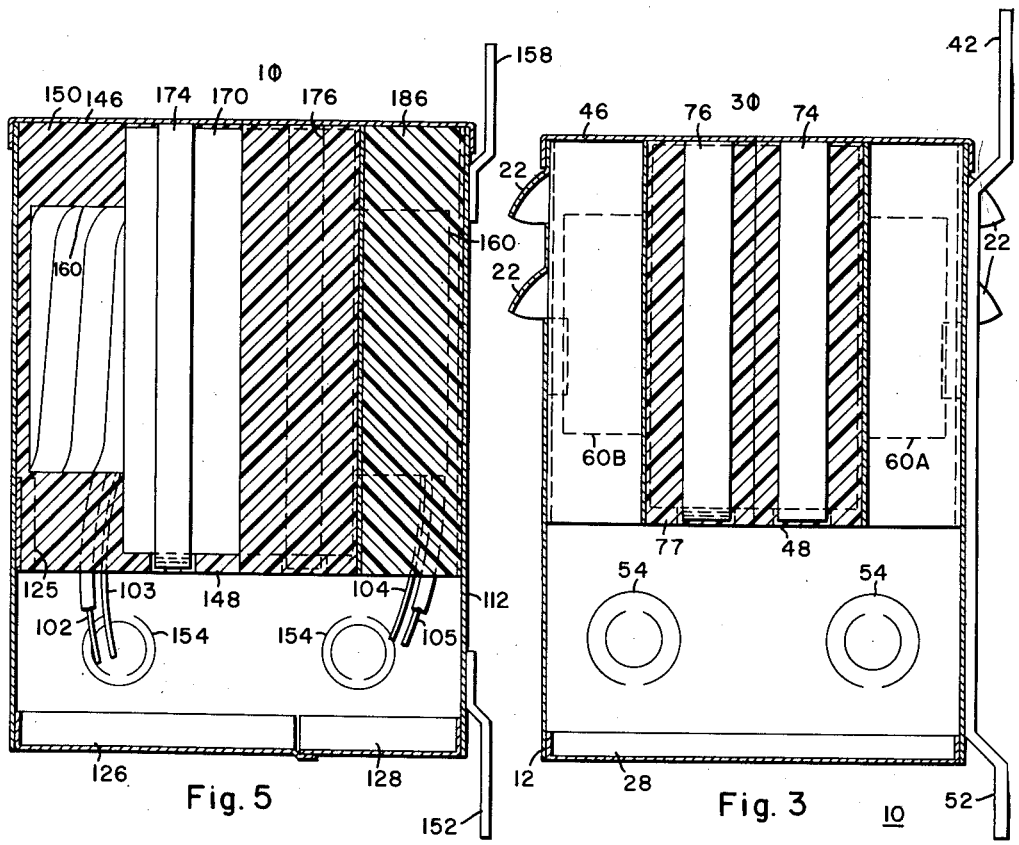

United States Patent Office 3,030,596
Patented Apr. 17, 1962

3,030,596
INSULATED ELECTRICAL APPARATUS
Edward N. Henry, Sharpsville, and Carl Piaia, Jr., Greenville, Pa., assignors to Westinghouse Electric Corporation, East Pittsburgh, Pa., a corporation of Pennsylvania
Filed Oct. 30, 1958, Ser. No. 770,773
12 Claims. (Cl. 336—61)

This invention relates to electrical apparatus and more particularly to electrical apparatus provided with insulation comprising a mixture of cured thermosetting resins and finely divided, inorganic, inert fillers.

In copending application Serial No. 718,345, filed by Carl Piaia, Jr., et al., on February 28, 1958, and assigned to the same assignee as the present application, there is disclosed a new construction for insulated electrical apparatus, specifically a transformer, including a casing and insulation comprising a mixture of cured thermosetting resin and finely divided inorganic fillers. The construction disclosed in said application is particularly adapted to certain types of electrical apparatus, specifically to certain ratings of single-phase transformers. In other applications, however, such as in polyphase transformers and different types of single-phase transformers, it is desirable to provide transformers having a construction similar to that disclosed in said application, but having an improved cooling efficiency.

It is an object of this invention to provide a new and improved electrical apparatus provided with an insulation that has a high degree of thermal conductivity.

Another object of this invention is to provide a new and improved electrical apparatus, such as a transformer, having a casing and insulation comprising a mixture of cured thermosetting resin and finely divided inorganic fillers.

A more specific object of this invention is to provide a transformer including a casing and insulation comprising a mixture of cured thermosetting resin and finely divided inorganic fillers and having an improved cooling efficiency or arrangement.

Other objects of the invention will in part be obvious and will in part appear hereinafter.

Figure 1:
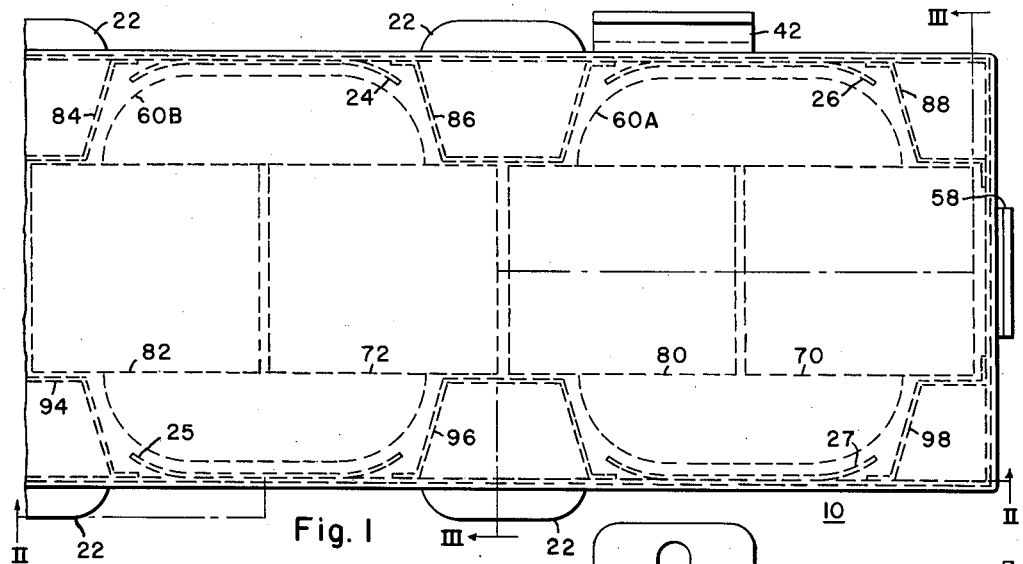
Figure 2:
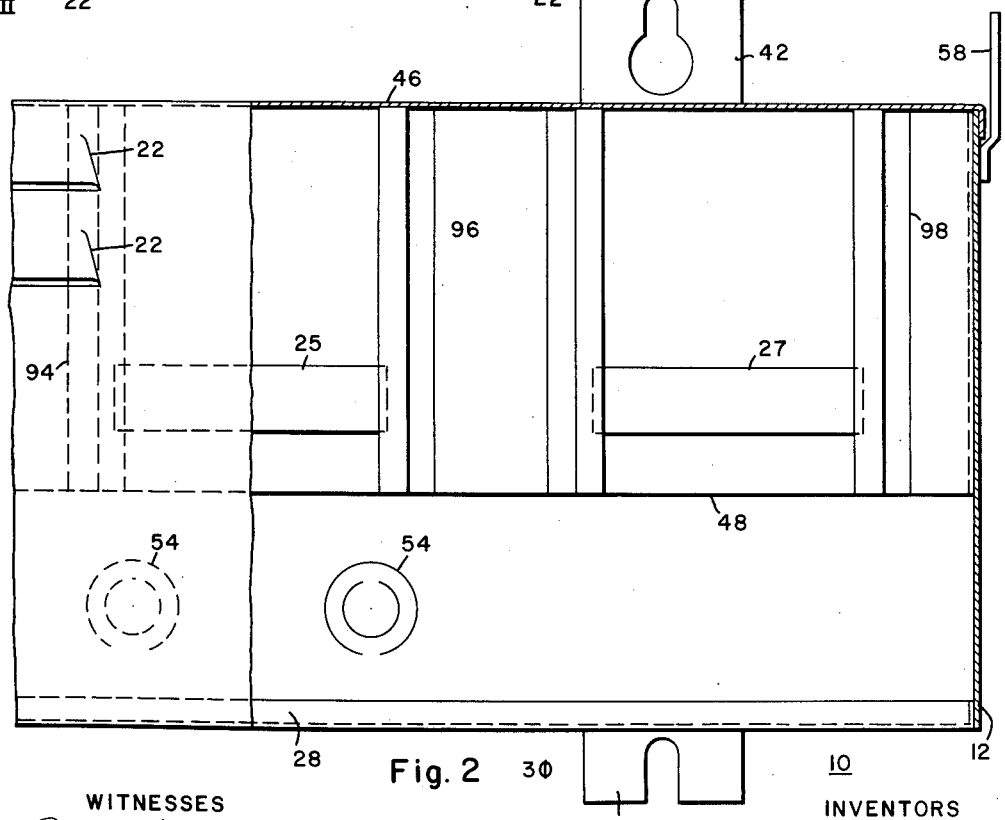

For a fuller understanding of the nature and objects of the invention, reference should be had to the following detailed description taken in connection with the accompanying drawings in which:

FIGURE 1 is a partial top plan view of a transformer illustrating a first embodiment of the invention, FIG. 2 is a partial view in front elevation, partly in section of the transformer shown in FIGURE 1 taken along the line II—II, FIG. 3 is a sectional view, in side elevation, of the transformer shown in FIG. 1 taken along the line III—III, FIG. 4 is a top plan view of a transformer illustrating a second embodiment of the invention, and FIG. 5 is a sectional view, in side elevation, of the transformer shown in FIG. 4 taken along the line V—V.

Referring now to the drawings and FIGS. 1, 2 and 3 in particular, there is illustrated an electrical inductive apparatus, specifically a polyphase transformer 10, constructed in accordance with the teachings of this invention. In general, the transformer 10 includes a casing 12 having disposed therein the cores 82 and 72 and 80 and 70 on which the windings 60B and 60A, respectively, are inductively disposed. The space between the windings 60A and 60B and the cores 80 and 70 and 82 and 72 and the casing 12 is filled with an insulating material 77 by means of which the heat generated in the windings 60A and 60B and the cores 80, 70, 82 and 72 is thermally conducted to the casing 12.

In particular, the casing 12 includes a top portion or cover 46 and a bottom portion or member 28 which are secured to the walls of the casing 12 by suitable means, such as welding or screws (not shown). The casing 12 also includes one or more upper mounting brackets 42 and one or more lower mounting brackets 52 which are secured to the casing 12 by a suitable means, such as welding. The casing 12 may also include one or more lifting lugs 58 which are secured to the casing 12 by suitable means, such as welding, adjacent to the top cover or plate 46. The casing 12 is also provided with conventional knockouts or conduit openings 54 to permit the passage of electrical connections into the casing 12. The purpose of the spacing members or duct-forming members 84, 86, 88, 94, 96 and 98, the bracket members 24 through 27, which are secured or welded to the inside of the casing 12, and the louvers 22, will be described in detail hereinafter.

The cores 82, 72, 80 and 70 are each of conventional type "C" wound construction and each of said cores is provided with an associated banding strap for drawing the parts of each of said cores together. The banding straps 76 and 74 are shown in FIG. 3 for the cores 70 and 72, respectively. It is obvious that other types of cores could be employed, such as the stacked laminated type. It is to be understood that the windings 60A and 60B may be provided with leads (not shown) which would extend below the insulating material 77 into the space between the cores 82, 72, 80 and 70 and the windings 60B and 60A and the bottom member 28 inside of the casing 12. As shown in FIGS. 1 and 2, the polyphase transformer 10 is illustrated as including two core and coil assemblies which comprise the windings 60B and the associated cores 82 and 72 and the windings 60A and the associated magnetic cores 80 and 70, respectively. It is to be understood, however, that the transformer 10 may include any number of core and coil assemblies which would each be associated with one or more of the phases of the transformer 10.

In general, the insulating material 77 comprises a mixture of certain types of solventless thermosetting resins, such as those of the epoxy type, the polyester type, or the silicone type and certain finely divided, inorganic, non-friable, inert fillers. The fillers, which may be employed in accordance with this invention, comprise at least one filler selected from the group consisting of silica, silicates, alumina, and hydrated alumina. Suitable resins and fillers of the above types and the methods of preparing them are described in greater detail in copending application Serial No. 718,345, previously mentioned. Plasticizers may be added to the resins to provide for more elastic products.

The resins employed in the mixture which forms the insulating material 77 are converted or cured to a thermosetting state or condition as will be described hereinafter. The insulating material 77 then forms a solid mass with the cores 82, 72, 80 and 70, the windings 60A and 60B and with the bracket members 24 through 27, the bonding action between the insulating material 77 and said cores and said windings and the bonding action between the insulating material 77 and the casing 12 and the bracket members 24 through 27 serving to support said cores and said windings inside the casing 12. Referring to FIGS. 2 and 3, it will be noted that the insulating material 77 fills the casing 12 to a predetermined level as indicated at 48.

The duct-forming or spacing members 84, 86, 88, 94, 96 and 98, the bracket members 24 through 27 and the louvers 22, as well as the purpose of said features, will now be described in detail. The duct-forming or channel members 84, 86, 94 and 96 are substantially vertically disposed inside the casing 12 between adjacent core and coil assemblies of the transformer 10 to provide cooling passageways through the insulating material 77. Each of the latter duct-forming members includes extending portions which are secured or welded to the walls of the casing 12 to thereby substantially prevent the entrance of the insulating material 77 inside said duct-forming members. Similarly, the duct-forming or spacing members 88 and 98 are disposed adjacent to the outside corners of the casing 12 which is illustrated as being substantially rectangular and includes extending portions which are similarly secured or welded to the inside of the casing 12 to form cooling passageways through the insulating material 77. The louvers 22 may be provided to cooperate with the duct-forming members 84, 86, 94 and 96 to permit the flow of a cooling fluid, such as air, from the lower part of the casing 12 through the insulating material 77 to the outside of the casing 12. It is to be understood that the bottom portion or member 28 of the casing 12 may be provided with recesses or openings (not shown) which would cooperate with the duct-forming members 84, 86, 94 and 96 and the associated louvers 22 to permit the flow of cooling air by convection through the transformer 10. An alternative construction to the louvers 22 would be to inwardly bend a portion of the walls of the casing 12 adjacent to the top portion 46 and the channel members 84, 86, 94 and 96 of the casing 12.

Each of the bracket members 24 through 27, which may be provided in the form of a strip or piece of metal, are secured to the inside of the casing 12 with the ends of said bracket member bent or disposed away from the inside of the casing 12 to thereby be embedded in the insulating material 77. The purpose of the bracket members 24 through 27 is to provide additional support for the solid mass which includes the insulating material 77, the cores 82, 72, 80 and 70 and the windings 60B and 60A, and to prevent separation of said mass from the inside of the casing 12. It is to be understood that additional bracket members, such as winged channel member of the type disclosed in copending application Serial No. 718,345, may be disposed inside the casing 12 adjacent to the top portion 46 to insure additional support and assist in the positioning of the core and coil assemblies inside the casing 12 of the transformer 10.

The method of producing electric apparatus such as the transformer 10 in accordance with the teachings of this invention will now be described. First the bracket members 24 through 27 and the duct forming members 84, 86, 88, 94, 96 and 98 are secured or welded to the inside of the casing 12 which is provided with the louvers 22. Next, the core and coil assembly for each of the different phases of the transformer 10, specifically the cores 82, 72, 80 and 70 and the windings 60B and 60A, are positioned in the casing 12 with the upper end of each of said cores disposed adjacent to the top portion 46 of the casing 12. A suitable liquid resin of one of the types previously mentioned, having a low viscosity, is introduced into the casing 12 to a predetermined level while the casing 12 is disposed in a position which is inverted from that shown in FIG. 2, that is, with the top portion 46 temporarily functioning as the bottom of a container which is formed by the sides of the casing 12 and the top portion 46. Thereafter, finely divided, inorganic filler is introduced into the casing 12 until the level of the mixture reaches substantially to the top of the windings 60A and 60B. The casing 12 is then vibrated with the amplitude of vibration gradually increasing until the resin appears to have impregnated the windings 60A and 60B and substantially filled all the open spaces or voids in the cores 82, 72, 80 and 70 and the windings 60B and 60A. During the vibrating of the casing 12, after the windings 60A and 60B appear to be completely impregnated, the balance of the filler is added until the level of the mixture reaches substantially to the top of the cores 82, 72, 80 and 70 as indicated at 48 in FIGS. 2 and 3. The potted transformer 10 is then placed in an oven or heating device or current is passed through the unit to bring it to a predetermined temperature and for a period of time sufficient to cure the insulating material 77 to a tough, hard solid. After the insulating material 77 has been cured, it is assumed that the bottom section 28 of the casing 12 is assembled in place and secured to the casing 12 by suitable means, such as screws or clamps.

A preliminary step may be added to the above procedure if the closed end of the casing 12, such as the top portion 46, is not completely sealed or leakproof. In the latter case a small amount of the thermosetting resin may be introduced into the casing 12 at the closed end of said casing which is to be sealed and a small amount of filler also introduced before the cores 82, 72, 80 and 70 and the windings 60B and 60A are positioned inside said casing. A fast setting catalyst, such as diethylene triamine, is then added to cause the small amount of resin and filler to be cured and to seal the closed end of the casing 12. An alternative to the latter method of sealing one end of the casing 12 would be to temporarily tape the end of the casing which is to be sealed.

It is to be understood that other means may be employed for compacting the mixture of resin and filler which makes up the insulating material 77, such as placing the casing 12 under vacuum to remove all air from around the particles of the filler to insure complete filling of the space around the cores 82, 72, 80 and 70 and the windings 60A and 60B. It is also to be understood that other means may be employed for converting the thermosetting resin to a thermosetting state. It has been found that a thermosetting resin of the epoxy type can be cured by placing the transformer 10 in an air-circulating oven for approximately three hours at 125° C. Other methods of curing or polymerizing the thermosetting resin may be employed in a particular application, such as subjecting the resin to certain types of radiation.

The space between the lower level of the insulating material 77 as indicated at 48 and the bottom section 28 of the casing 12 provides a convenient terminal chamber in which means for making any necessary terminal connections to the leads (not shown) of the windings 60B and 60A may be provided.

Referring now to FIGS. 4 and 5, there is shown a transformer 20 illustrating a second embodiment of the invention. In general, the transformer 20 is similar to the transformer 10 shown in FIGS. 1 through 3, except that the transformer is of the single-phase type rather than of a polyphase type as is the transformer 10. Similarly, the transformer 20 includes a casing 112 in which the cores 170 and 180 and the windings 160 are disposed. The space between the cores 170 and 180 and the windings 160 and the casing 112 is filled with an insulating material 150 which is the same as the insulating material 77.

In similar fashion, the casing 112 includes a top portion or cover 146, a fixed bottom member 128, and a removable bottom member 126 which are each secured to the walls of the casing 112. The casing 112 also includes the upper and lower mounting brackets 158 and 152, respectively. The duct-forming members 184, 188, 194 and 198 are secured to the inside of the casing 112 adjacent to the corners of said casing, which is illustrated as being substantially rectangular, in order to form cooling passageways through the insulating material 150. Similar to the transformer 10, the bracket members 124 and 125 are secured or welded to the inside of the casing 112 of the transformer 20 in order to provide additional support for the solid mass formed by the insulating material 150, the cores 170 and 180 and the windings 160. The casing 112 also includes conventional knockouts or conduit openings 154 to permit electrical connections to be brought into the casing 112.

The cores 170 and 180 are similar to the cores included in the transformer 10 and may be of conventional type "C" construction. The windings 160 are provided with leads 102 through 105 which extend below the insulating material, which fills the casing 112 to a predetermined level as indicated at 148. Each of the cores 170 and 180 includes one or more associated banding straps, such as indicated at 174 and 176 for the cores 170 and 180, respectively.

It has been found that the cooling efficiency of a transformer or other electrical inductive device, such as the polyphase transformer 10 or the single-phase transformer 20, is improved by the features of construction disclosed. In particular, in a polyphase device, such as the transformer 10, the cooling of the intermediate core and coil assemblies is substantially improved. An additional benefit arises from the transformer construction disclosed in that the amount of insulating material required in a particular application is also reduced because of the duct-forming members included. In a transformer having a substantially rectangular casing, such as the single-phase transformer 20 shown in FIGS. 4 and 5, it has been found that the cooling passageways provided by the duct forming or spacing members 184, 188, 194 and 198 also substantially improve the cooling efficiency in said transformer.

An alternative construction of the transformer 20 is also illustrated in FIG. 5. In certain applications, it may be advisable to at least partially fill the duct-forming members 184, 188, 194 and 198 with a material having a higher thermal conductivity than air or a higher thermal conductivity than the insulating material 150, as indicated at 186 for the duct-forming member 188 in FIG. 5. Examples of such materials include copper or aluminum powder or pellets, with or without a resin binder. The latter materials may not be suitable for use in direct contact with the windings of a transformer but would be suitable for direct contact with the duct forming members as disclosed in this application which are preferably made of a suitable metallic material. It is to be understood that the various duct-forming members included in the transformers 10 and 20 as disclosed would be suitably secured or welded to the associated casing to substantially prevent the introduction of the associated insulating material into the duct-forming members included in each transformer. It is also to be understood that forced air cooling may be included in a transformer as disclosed, rather than relying on natural convection of a cooling fluid through the cooling passageways provided. It is clear that in a particular application, the duct forming members may be removed from the final transformer after the resin is cured with the cooling ducts formed in the insulating material as disclosed. In order to prevent the introduction of precipitation, such as rain or snow into the casing of a transformer as disclosed, it may be advisable to add baffles in the path of the cooling fluid which passes through the cooling passageways as disclosed.

The apparatus embodying the teachings of this invention has several advantages. For example, a polyphase transformer construction as disclosed provides improved cooling for the core and coil assemblies of the different phases and permits a reduction in the overall physical size and weight of such a transformer. Similarly, in a single-phase transformer having a substantially rectangular casing, the cooling efficiency of the transformer construction disclosed is also improved, also permitting a reduction in the physical size of a single-phase transformer. In addition, the use of an insulating material in a construction as disclosed provides increased resistance to corrosion and contamination by dust and gases, reduces the noise level of an overall unit and permits a reduction in electrical clearances required compared to a conventional transformer of the same general type. The improved cooling and reduced clearances rseulting from the construction disclosed also permit reductions in the size and weight of the core and coil assemblies included in a transformer as previously described.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In an electrical inductive device having a plurality of magnetic cores each having one or more windings disposed thereon, the combination comprising, a casing for enclosing said cores and windings, a plurality of duct-forming members disposed substantially vertically between adjacent cores and windings inside said casing and insulating material substantially filling said casing to a predetermined level to embed said cores and windings, each of said duct-forming members being secured to the inside of said casing to prevent the entrance of said insulating material and to reduce the amount of insulating material required to embed said cores and windings, said insulating material comprising a mixture of finely divided inorganic, non-friable, inert filler and cured thermosetting resin, said cores and windings and said insulating material forming a solid mass which bonds to the inside of said casing, said duct-forming members being arranged to form cooling passageways between said insulating material and said casing and to provide additional cooling to intermediate cores and the windings disposed thereon.

2. In an electrical inductive device having a plurality of magnetic cores, each of said cores having one or more windings disposed thereon, the combination comprising, a casing for enclosing said cores and windings, a plurality of duct-forming members disposed substantially vertically between adjacent cores and windings inside said casing, insulating material substantially filling said casing to a predetermined level to embed said cores and windings, each of said duct-forming members being secured to the inside of said casing to prevent the entrance of said insulating material and to reduce the amount of insulating material required to embed said cores and windings, said insulating material comprising a mixture of finely divided, inorganic, non-friable, inert filler, said duct-forming members being arranged to provide cooling passageways between said insulating material and said casing and to provide additional cooling for the intermediate cores and windings, and a bracket member secured to the inside of said casing and embedded in said insulating material to prevent separation of said casing and said mass.

3. A polyphase transformer comprising a core and coil assembly for each phase of said transformer, a casing for enclosing the core and coil assemblies of said transformer, a plurality of duct-forming members disposed substantially vertically between adjacent core and coil assemblies to provide cooling passageways, and insulating material substantially filling said casing to a predetermined level to embed said core and coil assemblies, each of said duct-forming members being secured to the inside of said casing to prevent the entrance of said insulating material and to reduce the amount of insulating material required to embed said core and coil assemblies, said insulating material comprising a mixture of finely divided, inorganic, non-friable, inert filler and cured thermosetting resin, said cooling passageways being disposed substantially vertically between said insulating material and said casing, said cores and windings being bonded to the inside of said casing by said insulating material.

4. A polyphase transformer comprising a plurality of core and coil assemblies for the different phases of said transformer, a casing for enclosing said assemblies, a plurality of channel members substantially vertically disposed inside said casing between adjacent assemblies, and insulating material substantially filling the space between said assemblies and said casing and channel members, said material comprising a mixture of finely divided, inorganic, non-friable, inert filler and cured thermosetting resin, said channel members being arranged to provide cooling passageways between the inside of said casing and said insulating material and secured to the inside of said casing to prevent the entrance of said insulating material into said channel members and to reduce the amount of insulating material required to embed said core and coil assemblies, said assemblies and said insulating material forming a solid mass which bonds to the inside of said casing.

5. A polyphase transformer comprising a plurality of core and coil assemblies, a substantially rectangular casing for enclosing said assemblies, a first plurality of channel members vertically disposed inside said casing between adjacent assemblies, a second plurality of channel members substantially vertically disposed adjacent to and inside the corners of said casing, insulating material substantially filling the space between said assemblies and said casing and channel members, said material comprising a mixture of finely divided, inorganic, non-friable, inert filler and cured thermosetting resin, said channel members being arranged to provide cooling passageways between the inside of said casing and said insulating material and secured to the inside of said casing to prevent the entrance of said insulating material into said channel members and to reduce the amount of insulating material required to embed said core and coil assemblies, said assemblies and said insulating material forming a solid mass which bonds to said casing and a plurality of bracket members secured to the inside of said casing and embedded in said insulating material to prevent the separation of said casing and said mass.

6. A polyphase transformer comprising a plurality of core and coil assemblies, a casing for enclosing said assemblies, a plurality of spacing members disposed substantially vertically between adjacent assemblies inside said casing, insulating material substantially filling said casing to a predetermined level to embed said assemblies, said insulating material comprising a mixture of finely divided, inorganic, non-friable, inert filler and cured thermosetting resin, and a material having a thermal conductivity higher than said insulating material at least partially filling each of said spacing members, said spacing members being arranged to provide cooling passageways between the inside of said casing and said insulating material and secured to the inside of said casing to prevent the entrance of said insulating material into said spacing members and to reduce the amount of said insulating material required to embed said assemblies, said assemblies and said insulating material forming a solid mass which bonds to said casing.

7. A polyphase transformer comprising a plurality of core and coil assemblies, a casing for enclosing said assemblies, a plurality of spacing members disposed substantially vertically between adjacent assemblies inside of said casing, insulating material substantially filling said casing to a predetermined level to embed said assemblies, said spacing members being arranged to provide cooling passageways between the inside of said casing and said insulating material and secured to the inside of said casing to prevent the entrance of said insulating material into said spacing members and to reduce the amount of said insulating material required to embed said assemblies, said insulating material comprising a mixture of finely divided, inorganic, non-friable, inert filler and cured thermosetting resin, a material having a thermal conductivity higher than said insulating material at least partially filling each of said spacing members between the inside of said casing and said spacing members, said assemblies and said insulating material forming a substantially solid mass which bonds to said casing, and a plurality of bracket members secured to the inside of said casing and embedded in said insulating material to prevent the separation of said casing and said mass.

8. In electrical apparatus having at least one winding disposed on a magnetic core, the combination comprising a substantially rectangular casing, said core and winding being disposed inside said casing, spacing members vertically disposed inside said casing adjacent to the corners of said casing, insulating material substantially filling the space between said core and winding and the inside of said casing to a predetermined level, the space between the predetermined level of said insulating material and the inside of said casing forming a terminal chamber, said insulating material comprising a mixture of finely divided, inorganic, non-friable, inert filler and cured thermosetting resin, said core and winding and said insulating material forming a solid mass which bonds to said casing, said spacing members being arranged to form cooling ducts between said insulating material and the inside of said casing and secured to the inside of said casing to prevent the entrance of said insulating material into said spacing members and to reduce the amount of insulating material required to fill said casing to a predetermined level, and a bracket member secured to the inside of said casing and embedded in said insulating material to prevent separation of said casing and said mass.

9. In electrical apparatus having at least one winding disposed on a magnetic core, the combination comprising a substantially rectangular casing, said core and winding being disposed inside said casing, spacing members vertically disposed in and secured to the inside of said casing adjacent to the corners of said casing, insulating material substantially filling the space between said core and winding and the inside of said casing to a predetermined level, said insulating material comprising a mixture of finely divided, inorganic, non-friable, inert filler and cured thermosetting resin, said core and winding and said insulating material forming a solid mass which bonds to said casing, said spacing members being arranged to form cooling ducts between said insulating material and said casing, and secured to the inside of said casing to prevent the entrance of said insulating material into said spacing members and to reduce the amount of insulating material required to fill said casing to a predetermined level, and a quantity of material having a thermal conductivity higher than said insulating material at least partially filling said spacing members between said spacing member and the inside of said casing.

10. A polyphase transformer comprising a core and coil assembly for each phase of said transformer, a substantially rectangular casing for enclosing the core and coil assemblies of said transformer, a first plurality of duct-forming members disposed substantially vertically between adjacent core and coil assemblies to provide cooling passageways, a second plurality of duct-forming members disposed substantially vertically adjacent to and inside each of the corners of said casing to provide cooling passageways, insulating material substantially filling said casing to a predetermined level to embed said core and coil assemblies, each of said duct-forming members being secured to the inside of said casing to prevent the entrance of said insulating material and to reduce the amount of insulating material required to embed said cores and windings, said cooling passageways being disposed substantially vertically between the inside of said casing and said insulating material, said insulating material comprising a mixture of finely divided, inorganic, non-friable, inert filler and cured thermosetting resin, said cores and windings being bonded to the inside of said casing by said insulating material, and a plurality of bracket members secured to the inside of said casing and embedded in said insulating material.

11. A three-phase transformer comprising three core and coil assemblies for the different phases of said transformer, a substantially rectangular casing for enclosing said assemblies, a first plurality of channel members substantially vertically disposed inside said casing between adjacent assemblies, a second plurality of channel members disposed substantially vertically adjacent to each of the corners of said casing inside said casing, insulating material substantially filling the space between said assemblies and said casing and channel members, said material comprising a mixture of finely divided, inorganic, non-friable, inert filler and cured thermosetting resin, said channel members being arranged to provide substantially vertical cooling passageways between the inside of said casing and said insulating material and secured to the inside of said casing to prevent the entrance of said insulating material into said channel members and to reduce the amount of insulating material to embed said core and coil assemblies, said assemblies and said insulating material forming a solid mass which bonds to said casing, and a plurality of openings in said casing adjacent to at least one end of each of said channel members to permit the flow of a cooling fluid through said insulating material to outside said casing.

12. A polyphase transformer comprising a plurality of core and coil assemblies, a casing for enclosing said assemblies, a plurality of spacing members disposed between adjacent assemblies inside of said casing, insulating material substantially filling said casing to a predetermined level to embed said assemblies, said spacing members being arranged to provide cooling passageways between the inside of said casing and said insulating material and secured to the inside of said casing to prevent the entrance of said insulating material into said spacing members and to reduce the amount of said insulating material required to embed said assemblies, said insulating material comprising a mixture of finely divided, inorganic non-friable, inert filler and cured thermosetting resin, a material having a thermal conductivity higher than said insulating material at least partially filling each of said spacing members between the inside of said casing and said spacing members, said assemblies and said insulating material forming a substantially solid mass which bonds to said casing, a plurality of bracket members secured to the inside of said casing and embedded in said insulating material to prevent the separation of said casing and said mass, and a plurality of openings in said casing adjacent to at least one end of each of said spacing members to permit the flow of a cooling fluid through said insulating material to the outside of said casing.

References Cited in the file of this patent

UNITED STATES PATENTS

| | | |
|---|---|---|
| 1,974,588 | Snell | Sept. 25, 1934 |
| 2,788,499 | Pappas | Apr. 9, 1957 |
| 2,825,034 | Birchard | Feb. 25, 1958 |

FOREIGN PATENTS

| | | |
|---|---|---|
| 175,239 | Great Britain | Nov. 16, 1922 |
| 1,020,141 | France | Nov. 12, 1952 |